(12) United States Patent
Cassells et al.

(10) Patent No.: US 6,426,046 B1
(45) Date of Patent: Jul. 30, 2002

(54) CHEMICAL VESSEL CAP

(75) Inventors: John MacLaren Cassells, Cambridgeshire; Richard Henry Gray, Cambridge, both of (GB)

(73) Assignee: Mettler-Toledo Myriad, Ltd., Hertfordshire (GB)

( * ) Notice: Subject to any disclaimer, the term of this patent is extended or adjusted under 35 U.S.C. 154(b) by 0 days.

(21) Appl. No.: 09/581,056

(22) PCT Filed: Nov. 17, 1998

(86) PCT No.: PCT/GB98/03459

§ 371 (c)(1),
(2), (4) Date: Aug. 29, 2000

(87) PCT Pub. No.: WO99/29588

PCT Pub. Date: Jun. 17, 1999

(30) Foreign Application Priority Data

Dec. 8, 1997 (GB) ................................................ 9725976

(51) Int. Cl.[7] .............................. B01L 3/00; B01L 3/02; B01L 11/00; B01L 9/00; G05D 16/00; B65B 7/28; B65D 55/02; B65D 39/00; B65D 41/00; B65D 43/00; B65D 47/00; B65D 51/00

(52) U.S. Cl. .................... 422/99; 422/100; 422/101; 422/102; 422/104; 422/113; 215/200; 215/218; 215/234; 215/244; 215/247

(58) Field of Search .................... 422/99, 100, 101, 422/102, 104, 113; 215/200, 211, 218, 234, 244, 247, 248, 259, 261

(56) References Cited

U.S. PATENT DOCUMENTS

| | | | |
|---|---|---|---|
| 3,637,102 A | | 1/1972 | Shaw |
| 4,084,718 A | * | 4/1978 | Wadsworth |
| 4,244,478 A | | 1/1981 | Handman |
| 4,295,974 A | * | 10/1981 | Cornell |
| 5,071,017 A | * | 12/1991 | Stull |
| 5,125,921 A | * | 6/1992 | Duschek |
| 5,250,266 A | * | 10/1993 | Kanner |
| 5,275,731 A | * | 1/1994 | Jahn |
| 5,369,034 A | * | 11/1994 | Hargett et al. |
| 5,393,674 A | * | 2/1995 | Levine et al. |
| 5,518,612 A | * | 5/1996 | Kayal et al. |
| 5,601,711 A | * | 2/1997 | Sklar et al. |
| 5,736,033 A | * | 4/1998 | Coleman |
| 5,860,937 A | * | 1/1999 | Cohen |
| 6,083,760 A | * | 7/2000 | Ditlow et al. |

\* cited by examiner

*Primary Examiner*—Jill Warden
*Assistant Examiner*—Brian R. Gordon
(74) *Attorney, Agent, or Firm*—Andrus, Sceales, Starke & Sawall, LLP

(57) ABSTRACT

A cap (1) for a chemical storage or reaction vessel comprising a seat for attachment, in use, to an opening of the vessel. A membrane (6) formed from a resilient material and having a slit (11) formed therein allows a substance sampling or delivery apparatus to pass therethrough in use, the membrane being positioned to slide within the seat substantially in the direction of passage of the sampling or delivery apparatus.

10 Claims, 2 Drawing Sheets

CHEMICAL VESSEL CAP

BACKGROUND OF THE INVENTION

This invention relates to caps for use with chemical storage vessels of the type used in chemical synthesis and chemical experimentation. During chemical experimentation and chemical product synthesis there is often a need to store chemicals in vessels in such a manner that they do not come into contact with atmospheric gases or other substances with which they might react. For many years the solution to this problem has been provided by a vessel with a cap including a septum formed from rubber or similar material. Such a cap provides an air tight seal to protect the contents of the vessel, and allows access to add or withdraw materials by piercing of the septum with a needle as required. Because of the nature of the septum, when the needle is removed, the septum closes to retain an air tight seal. With some caps, the septum is pre-pierced to enable access by needles of larger diameter.

Whilst the above type of cap performs reasonably well, there are a number of problems associated with them. Firstly, the septum is unable to retain an adequate seal after it has been pierced a number of times, as the septum material deforms, splits or is otherwise damaged by the needle. Secondly, even with a septum with a precut access hole, it is difficult to employ needles of large diameter which may be required to hold viscous substances unless a relatively large access hole is provided. Provision of a large access hole, however, does not allow provision of an adequate seal over time, as the septum deforms in use due to the forces applied to the septum during sampling/delivery apparatus insertion and withdrawal. A further problem is that, in many cases, it is desired to maintain the internal pressure of a vessel at a safe level. Such caps cannot cope with a storage of substances which may generate a gas build-up within the vessel, leading to the possibility of the vessel and/or cap exploding or leaking and spraying hazardous substances into a work area.

Another solution to the problem of storage of hazardous and reaction substances is to blanket the entire area in which experimentation or product synthesis is to be performed with an inert gas. It will be readily appreciated, however, that such an arrangement is very expensive and requires a large amount of machinery with high operating cost.

SUMMARY OF THE INVENTION

The present invention seeks to provide solutions to the above problems.

According to the present invention there is provided a cap for a chemical storage or reaction vessel, the cap comprising:

a seat for attachment, in use, to an opening of the vessel;

a membrane formed from a resilient material and having a slit formed therein to allow a substance sampling or delivery apparatus to pass therethrough in use, the membrane being positioned to slide within the seat substantially in the direction of passage of the sampling or delivery apparatus.

The cap may further comprise biasing means for biasing the membrane into a position within the seat in which it provides a gas seal between the exterior and interior of the vessel to which the cap is connected in use, the biasing means allowing movement of the membrane, under fluid pressure, into a gas release position.

The cap may include means for holding the membrane in compression in a direction substantially perpendicular to the direction of passage of the sampling or delivery apparatus.

The biasing means may be a coil spring, and may engage with a retaining member formed on the seat. The stiffness of the selected spring can determine, with a considerable degree of accuracy, the pressure at which the membrane slides to release container pressure. The membrane may be supported by a member formed on the inner surface of the seat, or may be arranged to rest, in use, on the neck of a container to which the cap is attached. The membrane may be retained within a membrane holding member which is arranged to enable sliding retention of the membrane within the skirt and which provides radial compression to keep the slit closed and prevent slit tearing. Such a membrane holding member may have a grooved outer surface to aid venting.

Provision of the sliding membrane ensures that repeated insertion and withdrawal of a substance sampling/delivery apparatus does not deform the membrane. It is common for a septum retained by a simple screw cap (such as those used on Wheaton vials) to be deformed into a cone shape when a relatively large needle is used to pierce the device. The septum cannot relax back to its original shape on withdrawal because the septum material is pulled out of the annular pinch area and friction prevents the septum relaXing back to its original diameter. The present invention can be adjusted such that on withdrawal of the sampling needle, the membrane is lifted momentarily, enabling the septum to relax back to its original diameter.

The provision of a sliding biassed membrane enables a good gas seal to be provided, but allows for any pressure build-up in the vessel to be released by the membrane moving against the biasing means.

Provision of a slit ensures that probes of much larger diameter than are possible with a pierceable septum arrangement can be used. It also reduces the entry and withdrawal forces placed on such probes, allowing the use of plastics material disposable probes. The slit may be formed during manufacture of the membrane during a simple die punching process. Provision of a slidable membrane enables replacement of the membrane to be performed simply if a membrane of different material is required or if it has become defective. Furthermore, the invention provides a cap which can be easily formed from non-reactive materials.

BRIEF DESCRIPTION OF THE DRAWINGS

One example of the present invention will now be described with reference to the accompanying drawings, in which.

DETAILED DESCRIPTION OF THE DRAWINGS

Figure 1:
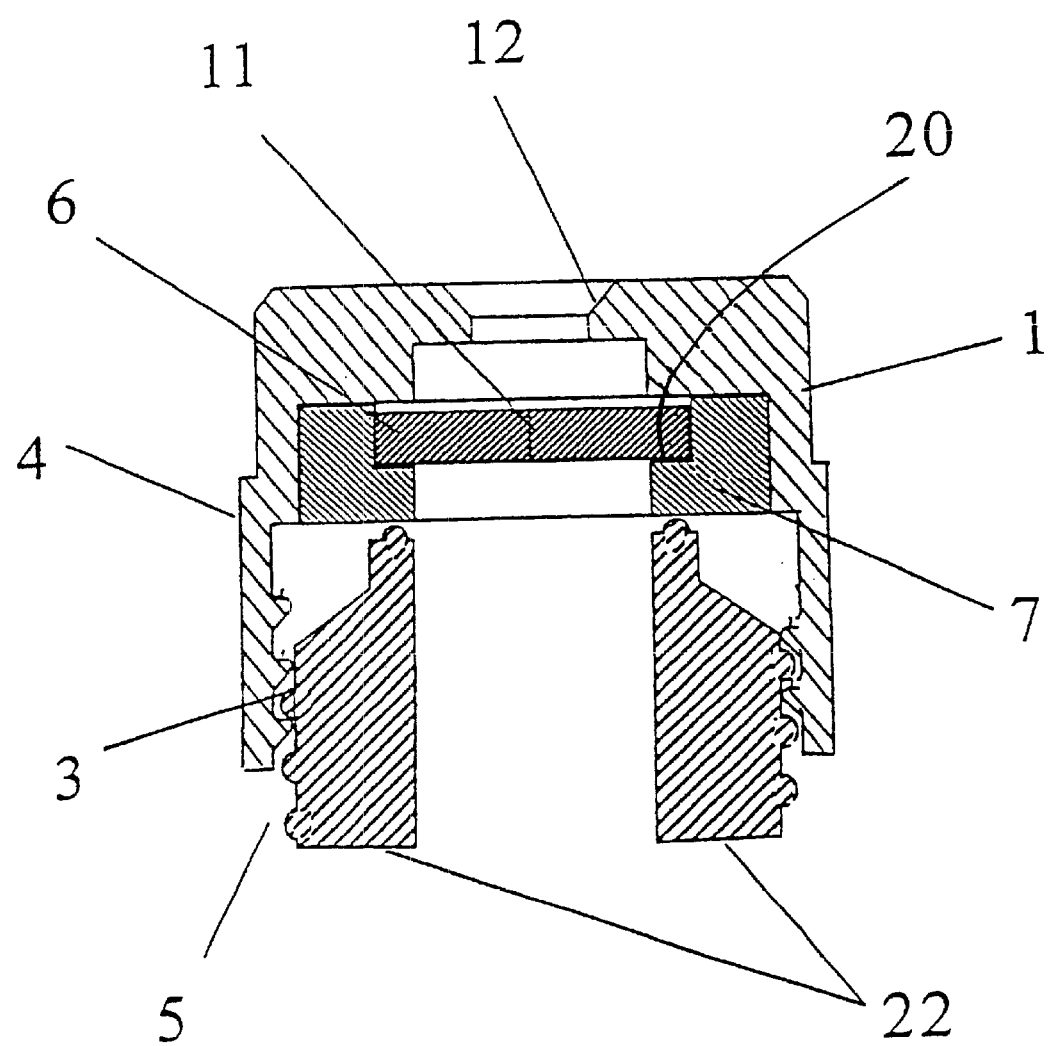
FIG. 1 shows a first example cap according to the present invention when attached to the neck of a chemical substance storage vessel.

Referring to FIG. 1, a cap 1 according to the invention is removably retained on the neck 22 of a chemical storage vessel by a screw thread 3 formed on the inner surface of a retaining member 4 on the cap and corresponding screw thread 5 on the neck of the chemical storage vessel 2.

Positioned within the cap 1 is a membrane 6 which is held in position by a membrane holding member 7 that includes a seat 20 for receiving the membrane 6. Formed in the membrane 6 is a slit 11 which allows a substance or delivery apparatus to pass through and gain access to the interior of the chemical storage vessel 2. The membrane holding member 7 allows the membrane 6 to slide in the direction of insertion/withdrawal of any such sampling/delivery apparatus. The extent of movement is controlled by a clearance between the holding member 7 and cap body 4. The membrane holding member 7 also holds the membrane 6 in compression in a direction substantially perpendicular to the direction of insertion/withdrawal. This ensures that a tight seal is provided by the membrane 6 even though the slit 11 has been provided and further maintains a seal when the membrane slides.

A guide member 12 is provided on the entry surface of the cap 1 so that damage to the membrane 6 or accidental removal of the membrane 6 from the membrane holding member 7 cannot occur if an attempt to insert a damaged sampling/delivery apparatus is made.

Figure 2:
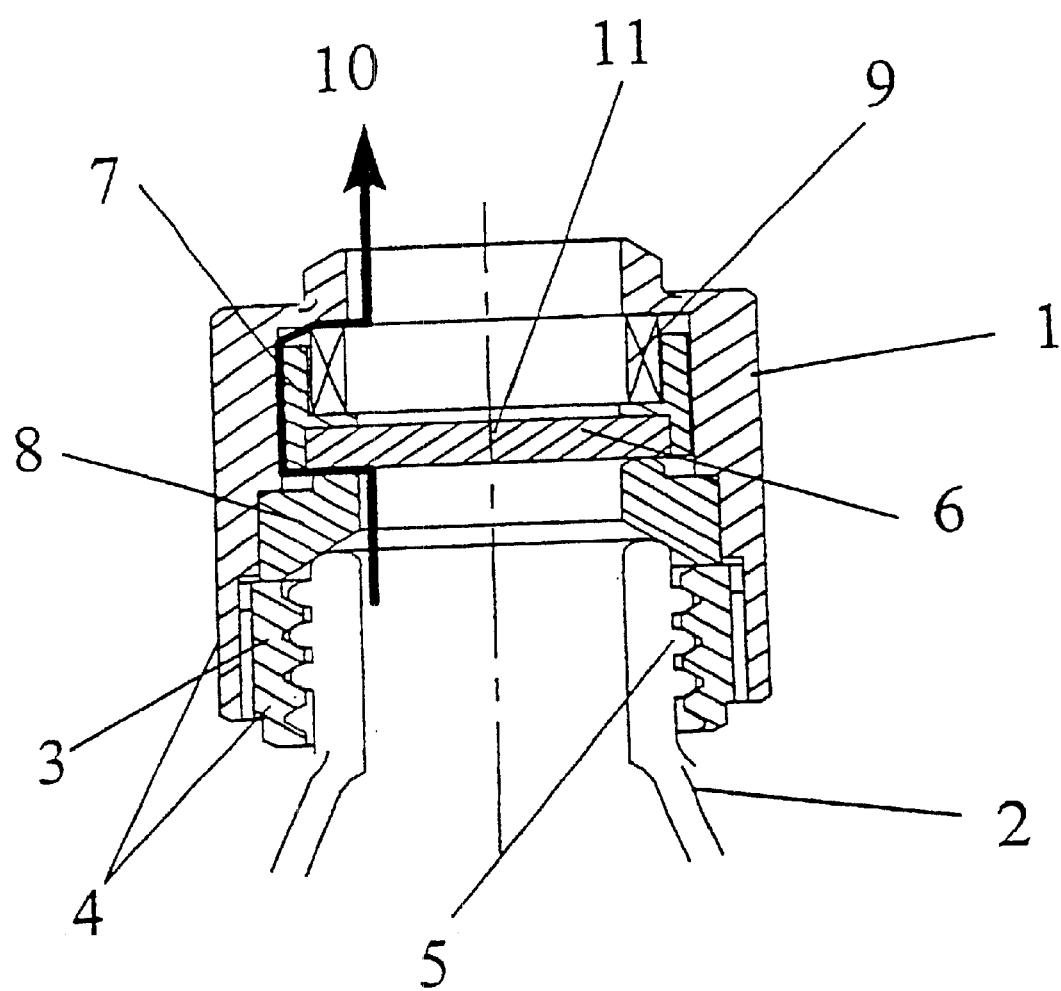
FIG. 2 shows a second example cap according to the present invention.

FIG. 2 shows a second example of the present invention in which components corresponding to those in the first example are identically numbered. In this example positioned within cap 1 and the member 4 is a membrane 6 which is held in-position by a sliding membrane holding member 7.

Biasing means 9, in the form of a coil-spring, engages with the membrane holding member 7 to bias the membrane into engagement with a seat 8 to provide a gas tight seal between the exterior and interior of the chemical storage vessel 2. As can be seen from FIG. 2, if pressure builds up within the chemical storage vessel 2, gas 10 forces the membrane 6 upwards breaking the seal between the membrane 6 and the seat 8, allowing gas escape. Formed in the membrane 6 is a slit 11 which allows substance/delivery apparatus to pass through the membrane 6 and gain access to the interior of the chemical storage vessel 2.

In either of the above examples the membrane 6 may be formed from rubber, perfluroelastomer or any resilient material which does not react with the contents of the chemical storage vessel 2. The membrane holding member 7 can be formed from any low friction material. The seat 8 may be formed from PTFE or other chemically resistant material.

As mentioned above, with the arrangements of the present invention, it is easy to replace the membrane 6 to provide a membrane of suitable material for the substances being handled, without needed to replace the whole cap. As also mentioned above, it is possible for the membrane 6 to be arranged such that it engages with the neck of the chemical storage vessel 2, rather than against the seat 8.

What is claimed is:

1. A cap for a chemical storage or reaction vessel, the cap comprising:
    a seat for attachment, in use, to an opening of the vessel;
    a membrane formed from a resilient material and having a slit formed therein to allow a substance sampling or delivery apparatus to pass therethrough in use, the membrane being positioned to slide within the seat substantially in the direction of passage of the sampling or delivery apparatus.

2. A cap according to claim 1, further comprising biasing means for biasing the membrane into a position within the seat in which it provides a gas seal between the exterior and interior of the vessel to which the cap is connected in use, the biasing means allowing movement of the membrane, under fluid pressure, into a gas release position.

3. A cap according to claim 2, wherein the biasing means is a coil spring.

4. A cap according to claim 3, wherein the spring engages with a retaining member formed on the seat.

5. A cap according to claim 1, wherein the cap includes means for holding the membrane to compression in a direction substantially perpendicular to the direction of passage of the sampling or delivery apparatus.

6. A cap according to claim 1, wherein the membrane is supported by a member formed on the inner surface of the seat.

7. A cap according to claim 1, wherein the membrane is arranged to rest, in use, on the neck of a container to which the cap is attached.

8. A cap according to claim 1, wherein the membrane includes a membrane holding member.

9. A cap according to claim 8, wherein the holding member provides radial compression to the membrane slit.

10. A cap according to claim 8, wherein a membrane holding member has a grooved outer surface.

* * * * *